April 1, 1924.
C. B. McDOWELL
1,489,084
CHAIN FASTENER
Filed May 26, 1923
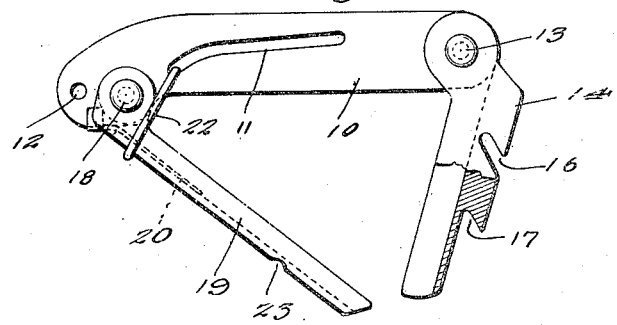
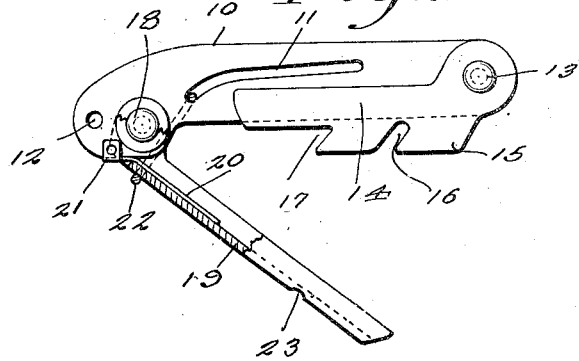
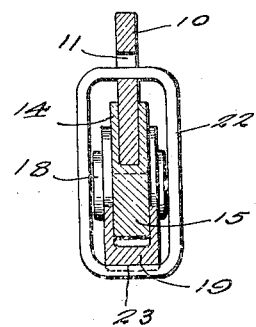
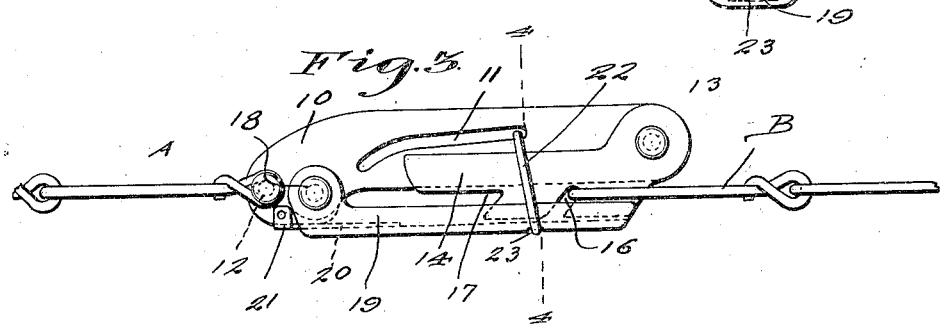
C. B. McDowell INVENTOR
BY Victor J. Evans ATTORNEY
R. Q. Thomas
WITNESSES Patented Apr. 1, 1924.

1,489,084

UNITED STATES PATENT OFFICE.

CLARE B. McDOWELL, OF BENDON, MICHIGAN.

CHAIN FASTENER.

Application filed May 26, 1923. Serial No. 641,673.

*To all whom it may concern:*

Be it known that I, CLARE B. MCDOWELL, a citizen of the United States, residing at Bendon, in the county of Benzie and State of Michigan, have invented new and useful Improvements in Chain Fasteners, of which the following is a specification.

This invention relates to fastening devices for skid chains, auto lugs, mud hooks and other devices intended to be mounted and secured upon a vehicle wheel for the purpose of preventing slipping or skidding, and has for its object the provision of a novel chain fastener which is so constructed that when closed it will exert a lever action for drawing the chain taut, the device being furthermore equipped with locking means for holding the fastening means positively against loosening or disengagement.

An important object is the provision of a fastener of this character which will be simple and inexpensive in manufacture, easy to install and operate, efficient and durable in service and a general improvement in the art.

With the above and other objects and advantages in view the invention consists in the details of construction to be hereinafter more fully described and claimed and illustrated in the accompanying drawings, in which:

Figure 1 is a side elevation of the device in fully open position,

Figure 2 is a side elevation showing the holding member swung into operative position for tightening the chain, Figure 3 is a similar view showing the locking member in its locking position and fastened by the sliding loop, Figure 4 is a cross section on the line 4—4 of Figure 3.

Referring more particularly to the drawings I have shown my device as comprising a body member 10 which may be formed of sheet metal or from a casting as preferred and which is provided with a longitudinal inclined slot 11 which has one end slightly curved to correspond substantially to the slight curvature or contour of the body 10. One end of the member 10 is formed with a hole 12 within which is engaged one endmost link A of a chain or similar device to be fastened.

Pivoted at 13 on the opposite end of the body is an elongated holding member 14 which is channeled in cross section so as to straddlingly engage upon one edge of the body 10. The bight portion of this channel shaped member is thickened as indicated at 15 and formed with a notch 16 and a cut away portion 17.

Pivoted at 18 on the body at a point spaced inwardly from the hole 12 is an elongated locking member 19 of a lever like construction and formed channel shaped in cross section to straddlingly engage upon the thickened portion 15 of the holding member 14. I further provide a leaf spring 20 suitably secured at one end upon the body, as for instance by means of an ear 21 and lying within and bearing outwardly upon the bight portion of the channel shaped member 19 for normally urging the same away from the body 10 or into open position.

As stated above one endmost link A of the chain is engaged within the hole 12 and the other endmost link B is engaged within the notch 16 or the cut away portion 17 as may be preferred or necessary depending upon the desired tautness of the chain. The member 14 is swung into engagement with the body 10 and the locking member 19 is swung into straddling engagement with the member 14. For maintaining this position, I provide a ring or loop 22 which is slidable within the inclined slot 11 and which embraces the member 19. The outer edge of the member 19 is formed with a notch 23 within which the ring 22 is engaged and it will be apparent that the outward swinging tendency of the member 19 under the influence on the spring 20 will maintain a sufficient pressure of the member 19 against the ring for preventing the ring from jarring out of the notch 23.

From the foregoing description and a study of the drawings it will be apparent that I have thus provided a simply constructed and consequently inexpensive chain fastener which will be highly efficient and satisfactory for use in connection with skid chains or in fact any other chains where it is necessary to made connections. The device requires no tools for effecting the opening and closing thereof and is bound to be a great saver of time, labor and annoyance.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A chain fastener comprising an elongated body member provided at one end with means for permitting attachment to a chain, a holding member of elongated lever formation pivoted upon the other end of the body and formed with chain receiving notches adapted to have engaged therein a link at the other end of the chain, a locking lever pivoted on the first mentioned end of the body and engaging said holding member, and means carried by the body and engaging said locking member for holding the same against movement, said means including a loop straddling said locking member and slidable along a slot in the body.

2. A chain fastener comprising an elongated body member provided at one end with means for permitting attachment to a chain, a holding member of elongated lever formation pivoted upon the other end of the body and formed with chain receiving notches adapted to have engaged therein a link at the other end of the chain, a locking lever pivoted on the first mentioned end of the body and engaging said holding member, and means carried by the body and engaging said locking member for holding the same against movement, said means including a loop straddling said locking member and slidable along a slot in the body, said locking member having its outer edge formed with a notch for receiving said loop, and a spring engaged within said locking member for normally urging the same away from the body.

In testimony whereof I affix my signature.

CLARE B. McDOWELL.